US009836655B2

(12) United States Patent
Hao

(10) Patent No.: US 9,836,655 B2
(45) Date of Patent: Dec. 5, 2017

(54) INFORMATION PROCESSING APPARATUS, INFORMATION PROCESSING METHOD, AND COMPUTER-READABLE MEDIUM

(71) Applicant: NEC CORPORATION, Tokyo (JP)

(72) Inventor: Jia Hao, Tokyo (JP)

(73) Assignee: NEC CORPORATION, Tokyo (JP)

( * ) Notice: Subject to any disclaimer, the term of this patent is extended or adjusted under 35 U.S.C. 154(b) by 49 days.

(21) Appl. No.: 14/747,499

(22) Filed: Jun. 23, 2015

(65) Prior Publication Data
US 2015/0371088 A1 Dec. 24, 2015

(30) Foreign Application Priority Data

Jun. 24, 2014 (JP) .................................. 2014-129611

(51) Int. Cl.
G06K 9/00 (2006.01)
G06T 7/246 (2017.01)
(52) U.S. Cl.
CPC .......... G06K 9/00771 (2013.01); G06T 7/246 (2017.01); G06T 2207/10016 (2013.01); G06T 2207/30196 (2013.01); G06T 2207/30232 (2013.01); G06T 2207/30241 (2013.01)
(58) Field of Classification Search
CPC .............................. G06T 7/20; G06K 9/00771
See application file for complete search history.

(56) References Cited

U.S. PATENT DOCUMENTS

| 6,404,900 | B1 | 6/2002 | Qian et al. | |
|---|---|---|---|---|
| 2008/0166045 | A1* | 7/2008 | Xu | G06K 9/00771 382/170 |
| 2009/0245573 | A1* | 10/2009 | Saptharishi | G06K 9/00771 382/103 |
| 2010/0328452 | A1* | 12/2010 | Jung | G06K 9/6206 348/135 |
| 2014/0253737 | A1* | 9/2014 | Kempinski | G06T 7/20 348/169 |
| 2015/0178953 | A1* | 6/2015 | Gao | G06F 17/2765 345/681 |

FOREIGN PATENT DOCUMENTS

| JP | 2007-219603 A | 8/2007 |
|---|---|---|
| JP | 2008-217714 A | 9/2008 |
| JP | 2009-48347 A | 3/2009 |
| JP | 4251719 B2 | 4/2009 |

OTHER PUBLICATIONS

International Search Report of PCT/JP2015/003148 dated Aug. 18, 2015 [PCT/ISA/220].

* cited by examiner

Primary Examiner — Shefali Goradia
(74) Attorney, Agent, or Firm — Sughrue Mion, PLLC

(57) ABSTRACT

An information processing apparatus including a memory storing instructions, and at least one processor configured to process the instructions to obtain an orientation, size, and position of a first subject in a first image, and an orientation, size, and position of a second subject in a second image, generate an estimated position of the first subject in the second image based on the orientation, size, and position of the first subject in the first image and the orientation and size of the second subject in the second image, calculate a distance between the estimated position of the first subject in the second image and the position of the second subject in the second image; and determine whether or not the first subject is the second subject based on the distance.

18 Claims, 10 Drawing Sheets

| SUBJECT | ORIENTATION | SIZE | POSITION |
|---|---|---|---|
| FACE OF PERSON A | 183 | 1231 | (78,58) |
| FACE OF PERSON B | 230 | 1564 | (105,216) |
| ⋮ | ⋮ | ⋮ | ⋮ |

732

| FRAME | SUBJECT | SIZE | POSITION |
|---|---|---|---|
| 31 | 12311 | 1231 | (78,58) |
| 32 | 12312 | 1546 | (93,118) |
|  | 12313 | 1325 | (125,203) |
| ⋮ | ⋮ | ⋮ | ⋮ |

737

| TRACKED SUBJECT | PAST FRAME | | | CURRENT FRAME | | | | ESTIMATED POSITION OF PERSON A IN CURRENT FRAME | DISTANCE | CORRESPONDENCE/NON-CORRESPONDENCE |
|---|---|---|---|---|---|---|---|---|---|---|
|  | ORIENTATION | SIZE | POSITION | SUBJECT | ORIENTATION | SIZE | POSITION |  |  |  |
| PERSON A |  |  |  | b |  |  |  |  |  |  |
|  |  |  |  | a |  |  |  |  |  | ✓ |
|  |  |  |  | c |  |  |  |  |  |  |
| ⋮ | ⋮ | ⋮ | ⋮ | ⋮ | ⋮ | ⋮ | ⋮ | ⋮ | ⋮ | ⋮ |

INFORMATION PROCESSING APPARATUS, INFORMATION PROCESSING METHOD, AND COMPUTER-READABLE MEDIUM

CROSS-REFERENCE TO RELATED APPLICATIONS

This application claims priority from Japanese Patent Application No. 2014-129611, filed on Jun. 24, 2014, in the Japanese Patent Office (JPO), the disclosure of which is incorporated herein by reference in its entirety.

BACKGROUND

Field

The present disclosure generally relates to an information processing apparatus, an information processing method, and a computer-readable medium.

Description of the Related Art

In the above technical field, there is a technique of estimating the movement of a face and outputting the estimated movement by: converting an input image to a chromatic space image; and estimating the position and size of the face based on the projection histogram of the chromatic space image.

There is also a technique of tracking a person by: detecting a face image and an image showing at least part of the body of the person from a frame. In this technique, if the face image is not detected, the tracking is performed based on the image showing the at least part of the body.

SUMMARY OF THE DISCLOSURE

Exemplary embodiments of the present disclosure overcome the above disadvantages and other disadvantages not described above. Also, the present exemplary embodiments are not required to overcome the disadvantages described above, and an exemplary embodiment of the present disclosure may not overcome any of the problems described above.

According to a first aspect of the present disclosure, an information processing apparatus is disclosed. The information processing apparatus includes a memory storing instructions, and at least one processor configured to process the instructions to obtain an orientation, size, and position of a first subject in a first image and an orientation, size and position of a second subject in a second image, generate an estimated position of the first subject in the second image based on the orientation, size, and position of the first subject in the first image and the orientation and size of a second subject in the second image, calculate a distance between the estimated position of the first subject in the second image and the position of the second subject in the second image, and determine whether or not the first subject is the second subject based on the distance.

An information processing method according to another aspect of the present disclosure may include obtaining an orientation, size, and position of a first subject in a first image, and an orientation, size and position of a second subject, generating an estimated position of the first subject in the second image based on the orientation, size, and position of the first subject in the first image and the orientation and size of the second subject in the second image, calculating a distance between the estimated position of the first subject in the second image and the position of the second subject in the second image, and determining whether or not the first subject is the second subject based on the distance.

A non-transitory computer-readable storage medium may store instructions that when executed by a computer enable the computer to implement a method. The method may include obtaining an orientation, size, and position of a first subject in a first image, and an orientation, size and position of a second subject in a second image, generating an estimated position of the first subject in the second image based on the orientation, size, and position of the first subject in the first image and the orientation and size of the second subject in the second image, calculating a distance between the estimated position of the first subject in the second image and the position of the second subject in the second image, and determining whether or not the first subject is the second subject based on the distance.

BRIEF DESCRIPTION OF THE DRAWING FIGURES

The above and/or other aspects of exemplary embodiments will be more apparent by describing certain exemplary embodiments with reference to the accompanying drawings, in which:

FIG. 8 is a diagram illustrating the configuration of a face information table, a frame image table, and a subject correspondence table included in the information processing apparatus according to the second exemplary embodiment.

DETAILED DESCRIPTION OF THE EXEMPLARY EMBODIMENTS

In the following detailed description numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawings.

[First Exemplary Embodiment]

An information processing apparatus 100 according to a first exemplary embodiment will be described with reference to FIG. 1. The information processing apparatus 100 may be an apparatus configured to determine whether or not subjects in past and current images are the same object.

Figure 1:
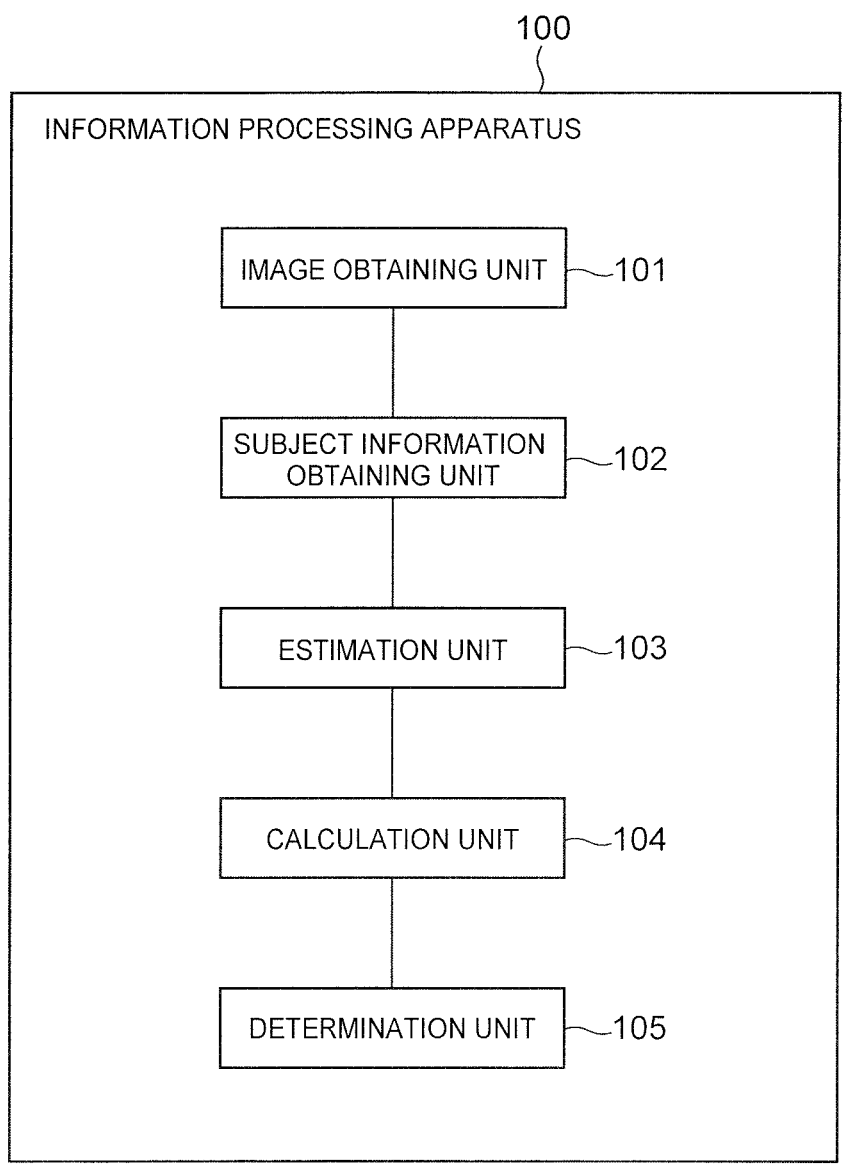
FIG. 1 is a block diagram illustrating the configuration of an information processing apparatus according to some exemplary embodiments.

As illustrated in FIG. 1, the information processing apparatus 100 may have an image obtaining unit 101, an object information obtaining unit 102, an estimation unit 103, a calculation unit 104, and a determination unit 105. The image obtaining unit 101 may obtain a past image (e.g., a first image) and a current image (e.g., a second image) by capturing a subject in motion. For example, the image obtaining unit 101 may begin tracking a subject in response to detecting that the subject is in motion. The object information obtaining unit 102 may obtain the orientation, size, and position of the subject in each image. The estimation unit 103 may derive an estimated position of a first subject in a current image based on the orientation, size, and position of the first subject in a past image and the orientation and size of a second subject in the current image. The calculation unit 104 may calculate the distance between the estimated position derived by the estimation unit 103 and the position of the second subject in the current image. The determination unit 105 may determine whether or not the first subject and the second subject are the same object based on the distance calculated by the calculation unit 104.

According to the present embodiment, the information processing apparatus 100 can determine whether or not the first subject in the past image and the second subject in the current image are the same object.

[Second Exemplary Embodiment]

Figure 2:
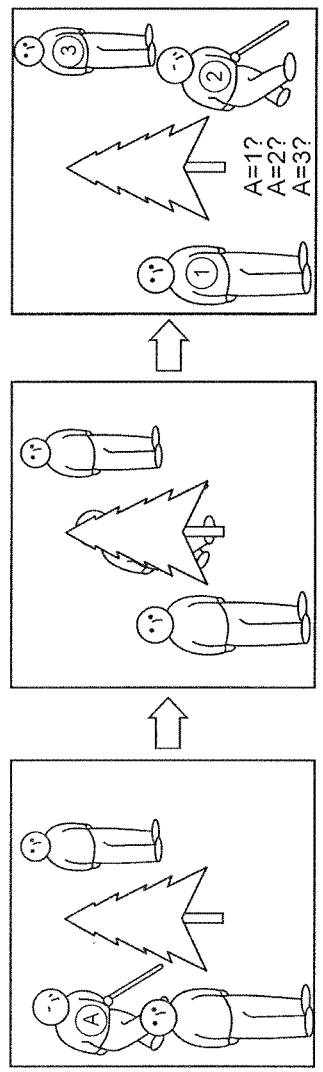
FIG. 2A is an example illustrating a situation in which a person A at the upper left of the image area is moving to the lower right of the image area.
FIG. 2B is an example illustrating a situation in which the person A is hidden by a tree and invisible in the middle of movement.
FIG. 2C is an example illustrating a situation in which the person A has moved to the lower right of the image area.

A typical situation in which tracking of a subject is lost and the tracking becomes difficult will be described with reference to FIG. 2A, FIG. 2B and FIG. 2C. FIG. 2A is an example illustrating a situation in which a person A at the upper left of the image area is moving to the lower right of the image area. FIG. 2B is an example illustrating a situation in which the person A is hidden by a tree and invisible in the middle of movement. For example, FIG. 2B shows an example of person A being obscured (e.g., lost, hidden, masked, kept from being seen, concealed partially or fully, momentarily untrackable and the like). FIG. 2C is an example illustrating a situation in which the person A has moved to the lower right of the image area. In this case, the person A is hidden by a tree in FIG. 2B and the person A once disappears from the image area and is in an invisible state. When the person A appears again on the image area in FIG. 2C, it cannot be determined that the person A illustrated in FIG. 2A corresponds to which one of persons 1, 2, and 3 illustrated in FIG. 2C. In some aspects, although the person 2 is actually the person A, the person 1 or the person 3 may be recognized as the person A and may be tracked, for example. In other aspects, the person 2 may be recognized as a person completely different from the person A. An error may occur in establishing a correspondence of each person in FIG. 2C, and tracking of the person A may be lost and the tracking may be difficult. A case has been described above in which the person A passes behind a tree and so is hidden and then appears. In other aspects, when the resolution of the image is reduced in FIG. 2B, an invisible state similar to what has been described may occur and the tracking may be lost. In other aspects, when image area blurring due to jiggling of hands, image blurring due to quick movement of the subject, or an unclear image due to out of focus are occurred, an invisible state may occur and the tracking may be lost.

Figure 3:
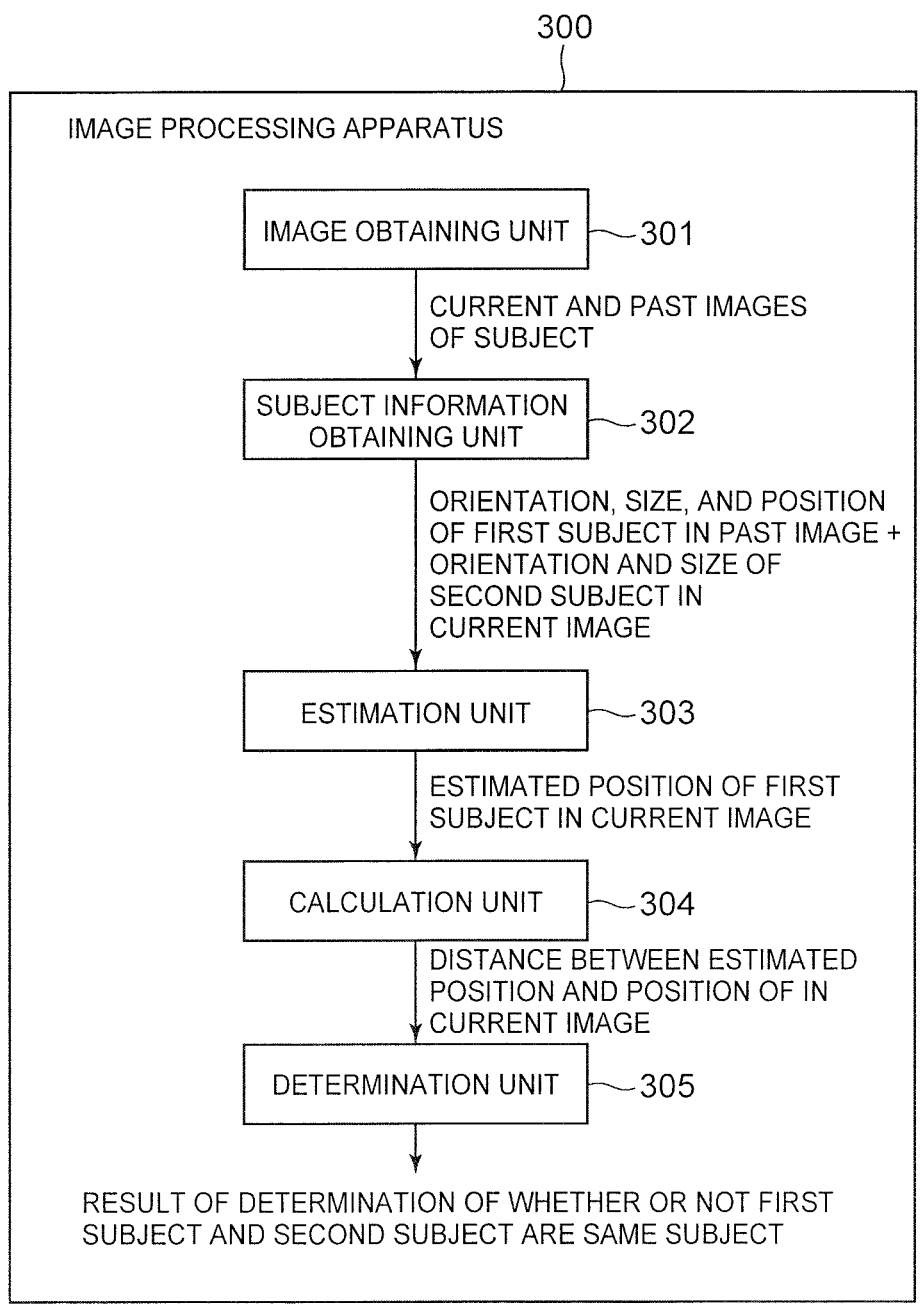
FIG. 3 is a block diagram illustrating the configuration of an information processing apparatus according to some exemplary embodiments.

FIG. 3 is a block diagram for illustrating the functional configuration of an information processing apparatus 300. The information processing apparatus 300 may include an image obtaining unit 301, an object information obtaining unit 302, an estimation unit 303, a calculation unit 304, and a determination unit 305.

The image obtaining unit 301 may obtain current and past images from images obtained by capturing a subject. In some aspects, the subject may be a moving subject that is a subject in motion.

The object information obtaining unit 302 may detect a subject from each image obtained by the image obtaining unit 301, and may obtain the orientation, size, and position of the subject in the image. In some aspects, when the subject in the past image is assumed to be a first subject, the object information obtaining unit 302 may obtain the orientation, size, and position of the first subject in the past image. In other aspects, when the subject in the current image is assumed to be a second subject, the object information obtaining unit 302 may obtain the orientation and size of the second subject in the current image. For example, when a subject is a person, the orientation of the subject may be the orientation of the face of the person and the size of the subject may be the distance between the eyes of the face of the person. Although a subject is described above as a person, the subject is not limited to the person. The subject may be any object, for example, an animal or a vehicle.

Based on the orientation, size, and position of a first subject in a past image and the orientation and size of a second subject in the current image, the estimation unit 303 may derive an estimated position of the first subject in the current image. In some aspects, the object information obtaining unit 302 may obtain the orientation, size, and position of the first subject. The estimation unit 303 may project the orientation, size, and position of the first subject from image space coordinates to real space coordinates. Further, the object information obtaining unit 302 may obtain the orientation and size of the second subject. The estimation unit 303 may project the orientation and size of the second subject from image space coordinates to real space coordinates. The estimation unit 303 may derive an estimated current position of the subject using the projected orientation, size, and position of the first subject and the projected orientation and size of the second subject.

Based on the estimated position derived by the estimation unit 303, the calculation unit 304 may calculate the distance between the estimated position and the position of the second subject in the current image.

The determination unit 305 may determine whether or not the first subject and the second subject are the same object based on the distance calculated by the calculation unit 304. In some aspects, the determination may be made by comparing the distance calculated by the calculation unit 304 with a predetermined threshold value. For example, when the calculated distance is within a predetermined threshold value, the determination unit 305 may determine that the first subject is the second subject (e.g., the first subject and the second subject are the same person, subject, tracked object, and the like). When at least two second subjects are present, the determination unit 305 may determine that a second subject with the shortest distance calculated by the calculation unit 304 is the same as the first subject.

As methods of determining to be the same object, a method of comparing a distance with a predetermined threshold value and a method of identifying an object with the smallest distance with the same object are described above. In other aspects, determination may be made by calculating the probability of the same object based on a calculated distance. As a probability calculation method, for example, there may be a method of calculating a probability based on a Gaussian distribution on the assumption that the distance follows to the Gaussian distribution.

Derivation of an estimated position and determination of whether or not the same object is present will be further described with reference to FIG. 4 and FIG. 5.

Figure 4:
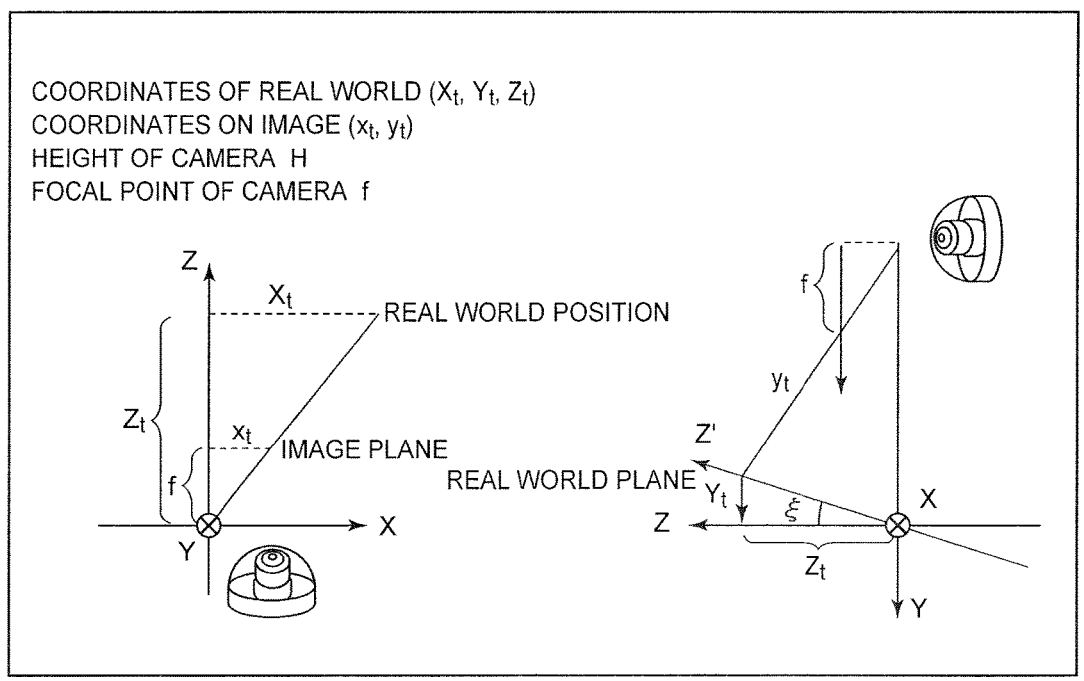
FIG. 4 is a chart illustrating a projection relationship between image space coordinates and real space coordinates.

FIG. 4 is a chart illustrating a projection relationship between image space coordinates and real space coordinates.

As illustrated in FIG. 4, let $(X_t, Y_t, Z_t)$ be real space coordinates, $(x_t, y_t)$ be image space coordinates, H be the height of a camera, f be the focal distance of the camera, and be the elevation angle of the camera Coordinate projection may be performed based on (Expression 1) to (Expression 3). In FIG. 4, Z' axis may represent a direction to which subject moves in real world plane. The real world plane may represent the ground of the real world, and may be X-Z' plane in FIG. 4.

$$\frac{x_t}{X_t} = \frac{f}{Z_t} \quad \text{[Expression 1]}$$

$$\frac{y_t}{H - |Y_t|} = \frac{f}{Z_t} \quad \text{[Expression 2]}$$

$$Y_t = -Z_t \tan\xi \quad \text{[Expression 3]}$$

Figure 5:
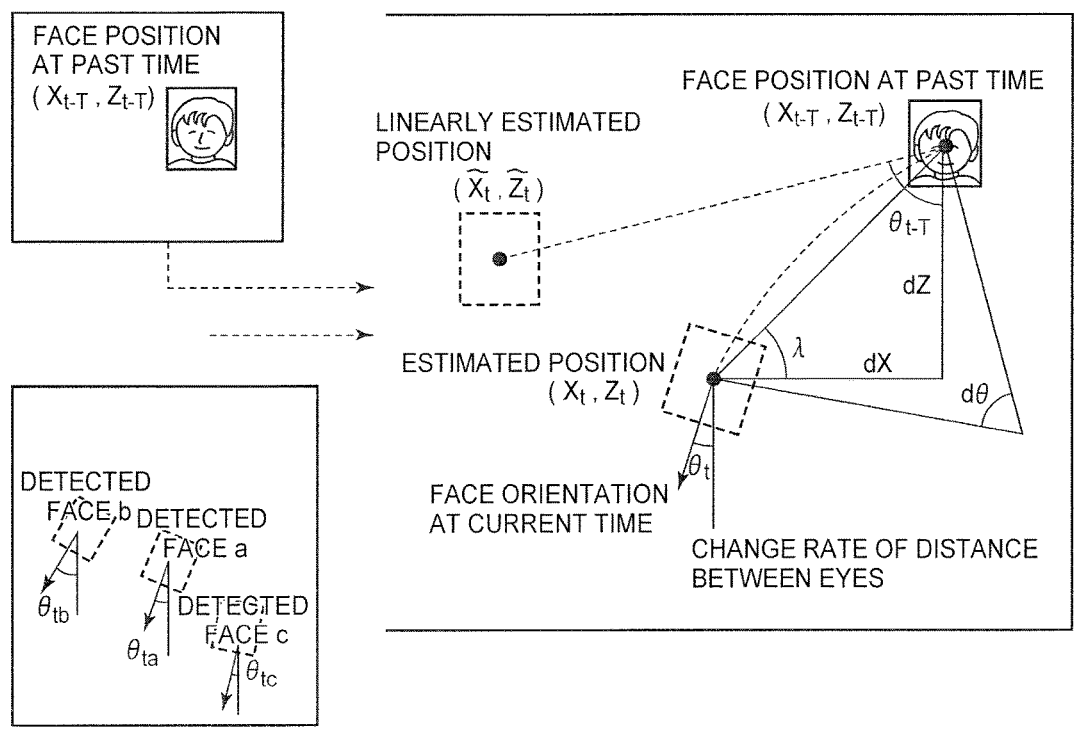
FIG. 5 is an explanatory diagram as to derivation of an estimated position of a person by an estimation unit when a subject is the person.
Figure 6:
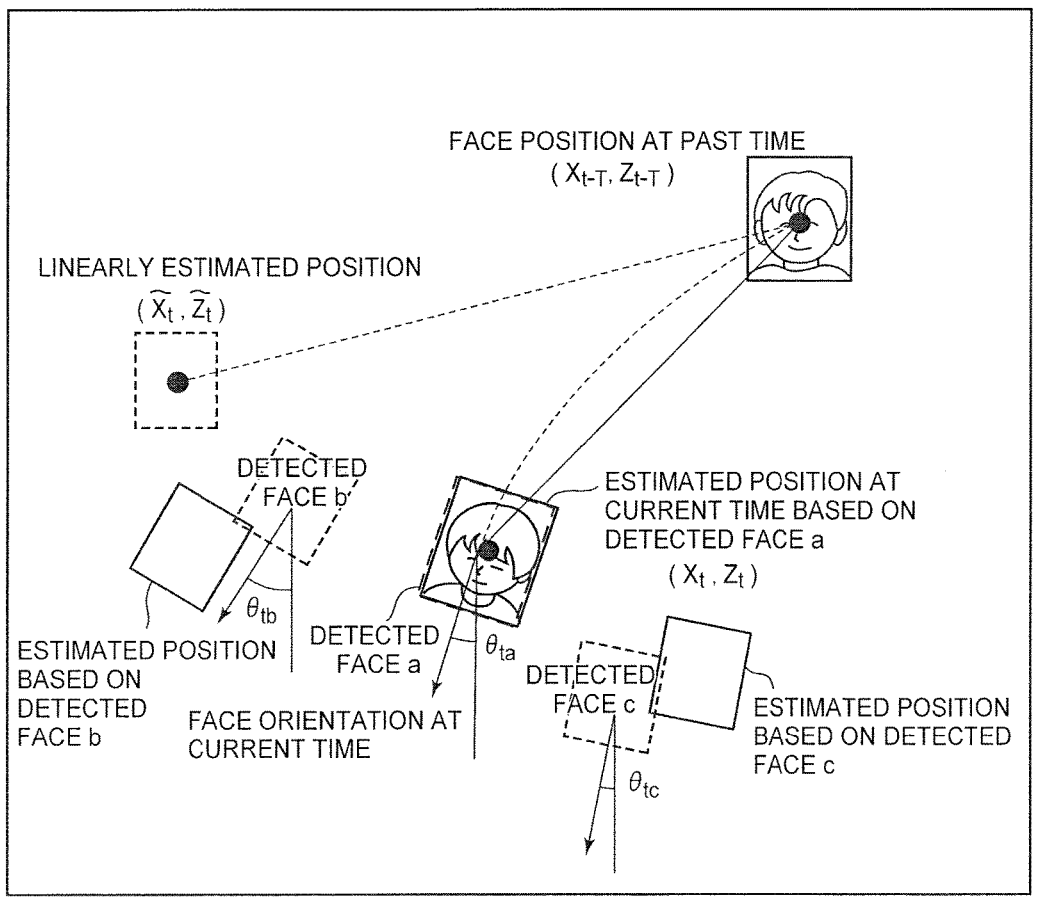
FIG. 6 is an explanatory diagram as to determination of whether or not the same object is in second subjects when a plurality of second subjects is present.

FIG. 5 is an explanatory diagram as to derivation of an estimated position of a person by the estimation unit 303 when a subject is the person. In FIG. 5 and FIG. 6 described below, it is assumed that the subject like a person does not vary, and the real space coordinate $Y_t$ does not vary. In description below, the real space coordinates $(X_t, Y_t, Z_t)$ may be referred to as $(x_t, Z_t)$.

As illustrated in FIG. 5, let $(X_{t-T}, Z_{t-T})$ be the face position of the first subject at a past time, and $\theta_{t-T}$ be the face orientation. Also, let $(X_t, Z_t)$ be an estimated position of the first subject at the current time. Further, let $\theta_t$ be the face orientation of the second subject at the current time. Further, let $a = w_t / w_{t-T}$ be the change rate of distance between inter-eye distance $w_t$ of the second subject at time t and inter-eye distance $w_{t-T}$ of the first subject at time t-T. $\theta_{t-T}$ which is the face orientation of the first subject at t-T may indicate an angle between direction of the optical axis of the camera and the axis representing the face orientation of the first subject at the time t-T. The face orientation of the first subject at the time t-T may be an orientation by representing a line connecting $(X_t, Z_t)$ and $(\tilde{X}_t, \tilde{Z}_t)$. $(\tilde{X}_t, \tilde{Z}_t)$ is a position estimated by linear estimation under the assumption that the face orientation of the first subject has no change between the past and the current, that is, the face orientation is constant.

The estimation unit 303 may derive a depth displacement dZ of the first subject in real space coordinates based on (Expression 4) described below. The reason why the depth displacement dZ is expressed as in (Expression 4) is because the size of an image is in inverse proportion to the distance from the lens.

$$dZ = \left(\frac{1}{a} - 1\right) Z_{t-T} \quad \text{[Expression 4]}$$

The estimation unit 303 may derive a change in the orientation of the first subject based on the (Expression 5) described below.

$$d\theta = \theta_t - \theta_{t-T} \quad \text{[Expression 5]}$$

The estimation unit 303 may derive parameter A based on the (Expression 6) described below.

$$\lambda = \frac{\pi - |d\theta|}{2} - |\theta_t| \quad \text{[Expressioin 6]}$$

The estimation unit 303 may derive a transverse displacement dX of the first subject based on the (Expression 7) described below.

$$dX = \frac{dZ}{\tan\lambda} \quad \text{[Expression 7]}$$

By the above calculation, the estimation unit 303 may derive an estimated position of the first subject $(X_t = X_{t-T} + dX, Z_t = Z_{t-T} + dZ)$ in consideration of the face orientation and the size (inter-eye distance).

FIG. 6 is an explanatory diagram as to determination of whether or not the same object is in the second subjects when a plurality of second subjects (three subjects in the present embodiment) is present. It is assumed that the object information obtaining unit 302 detects face a, face b, and face c as the second subject from the current image, and obtains the orientation, size and position of each detected face. In FIG. 6, detected positions indicated by a dotted line are illustrated. The estimation unit 303 may derive an estimated position in the current image based on the orientation, size and position of the first subject, and each of the detected face a, detected face b, and detected face c. In FIG. 6, the estimated position derived by the estimation unit 303 is indicated by a solid line. For example, when it is assumed that the first subject has moved to the position of the detected face b (the second subject), an estimated position of the first subject may be derived based on the orientation, size, and position of the face at the past time and the orientation and size of the detected face b (the second subject). In a similar manner, the estimation unit 303 may derive estimated positions for each of the detected face a and detected face c based on the orientation, and size of each of the detected face a and detected face c.

The calculation unit 304 may calculate the distance between the estimated position indicated by a solid line and the detected position indicated by a dotted line for each face. In some aspects, the calculation unit 304 may calculate the distance between the position of the detected face a and an estimated position based on the detected face a, the distance between the position of the detected face b and an estimated position based on the detected face b, and the distance between the position of the detected face c and an estimated position based on the detected face c. The determination unit 305 may determine a detected face with the shortest distance, in the present embodiment, the person having the detected face a is the same person as the person of the first subject.

In the above description, determination may be made according to the criterion of the smallest distance. In other aspects, the probability of being the same object may be calculated based on the distance and determination may be made using the highest probability. As a probability calculation method, for example, there may be a method of calculating a probability based on a Gaussian distribution on the assumption that the distance follows to the Gaussian distribution.

Figure 7:
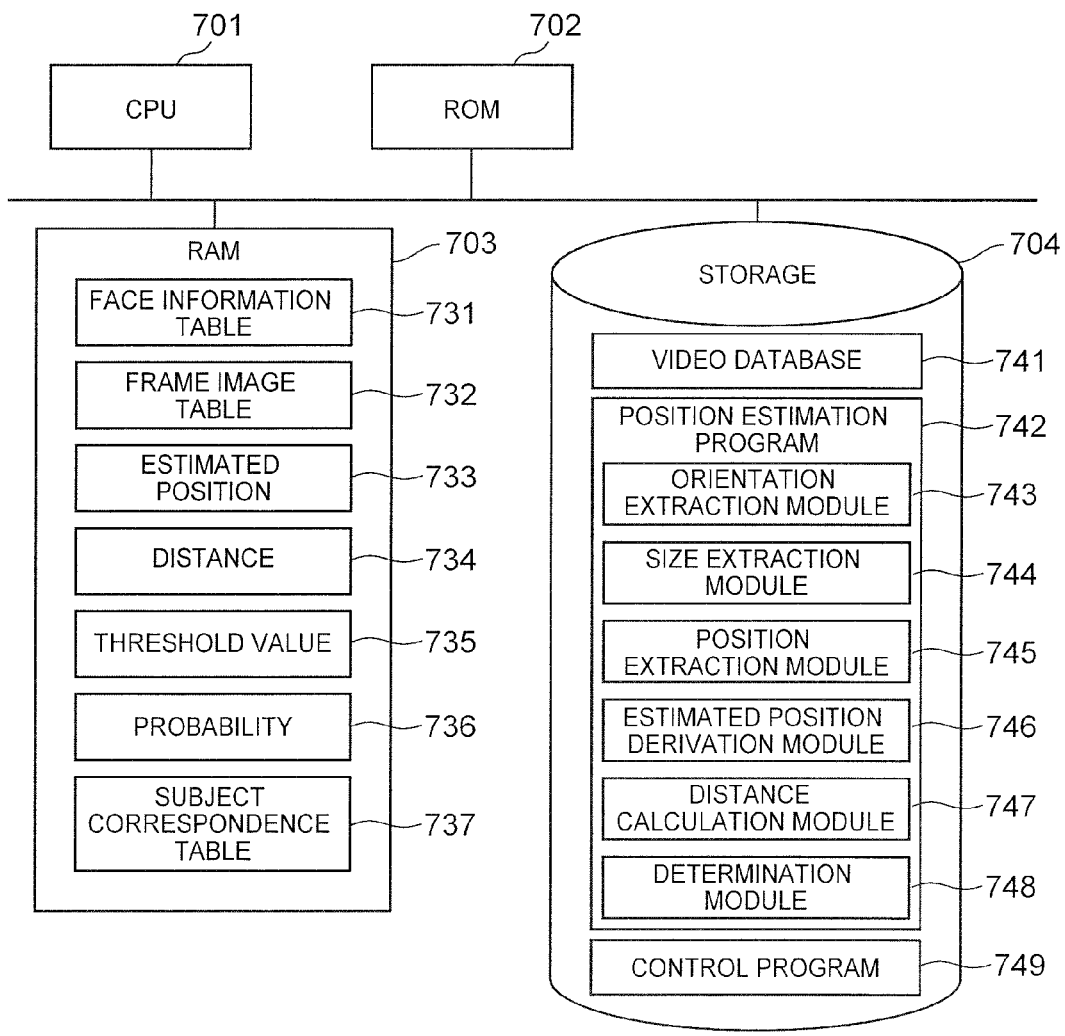
FIG. 7 is a block diagram illustrating the hardware configuration of the information processing apparatus according to the second embodiment of the present invention.

FIG. 7 is a block diagram illustrating the hardware configuration of the information processing apparatus 300 according to the present embodiment. The information processing apparatus 300 may include a CPU (Central Processing Unit) 701, a ROM (Read Only Memory) 702, a RAM (Random Access Memory) 703, and a storage 704.

The CPU 701 may be a processor for operational processing and achieve the functional constituent units of the information processing apparatus 300 by executing programs. The CPU 701 is not limited to be a single unit and may be provided as multiple units, and may also include a GPU (Graphics Processing Unit) for image processing. The ROM 702 may be a read-only memory and store a program and the like. The RAM 703 may be random access memory that is used by the CPU 701 as a work area for temporary storage. The RAM 703 may have an area for storing data which is necessary for implementing the present embodiment. As such data, the RAM 703 may include a face information table 731, a frame image table 732, an estimated position 733, a distance 734, a threshold value 735, a probability 736, and a subject correspondence table 737.

The storage 704 may be a storage device that stores a program, a database, and the like for implementing the present embodiment. The storage 704 may include a video database 741, a position estimation program 742, and a control program 749. The video database 741 may store video which is shot momentarily by an image capture device such as a video camera. The position estimation program 742 may be a program that derives an estimated position of the first subject in the current image based on the orientation, size, and position of the first subject in the past image and the orientation and size of the second subject in the current image. The position estimation program 742 may include an orientation extraction module 743, a size extraction module 744, a position extraction module 745, an estimated position derivation module 746, a distance calculation module 747, and a determination module 748. The control program 749 may be a program that controls the entire information processing apparatus 300.

FIG. 8 is a diagram illustrating the configuration of the face information table 731, the frame image table 732, and the subject correspondence table 737 included in the information processing apparatus 300 according to the present embodiment.

The face information table 731 may include information for the items of subject, orientation, size, and position. For example, the face information table 731 may include information for the subject of face A, that is, the orientation of the subject of face A is 183, the size is 1231, and the position is (78, 58). By combining the information on these items, the orientation, size, and position of the first subject and the orientation and size of the second subject may be generated.

The frame image table 732 may include information for the items of the size and position of each subject in each frame. For example, the frame image table 732 may include the information that subject number 12311 in the frame number 31 has the size of 1231 and the position of (78, 58). By combining the information on these items, the size, position of each subject in each frame can be identified.

The subject correspondence table 737 may include information for the items of tracked subject, past frame (including the items of orientation, size and position), current frame (including the items of subject, orientation, size and position), estimated position of the person A in current frame, distance, and correspondence/non-correspondence. For example, it can be seen from the item of correspondence/non-correspondence that the person A, which is a tracked subject, corresponds to the subject a in the current frame. In this manner, correspondence between subjects can be established and each subject can be tracked.

Figure 9:
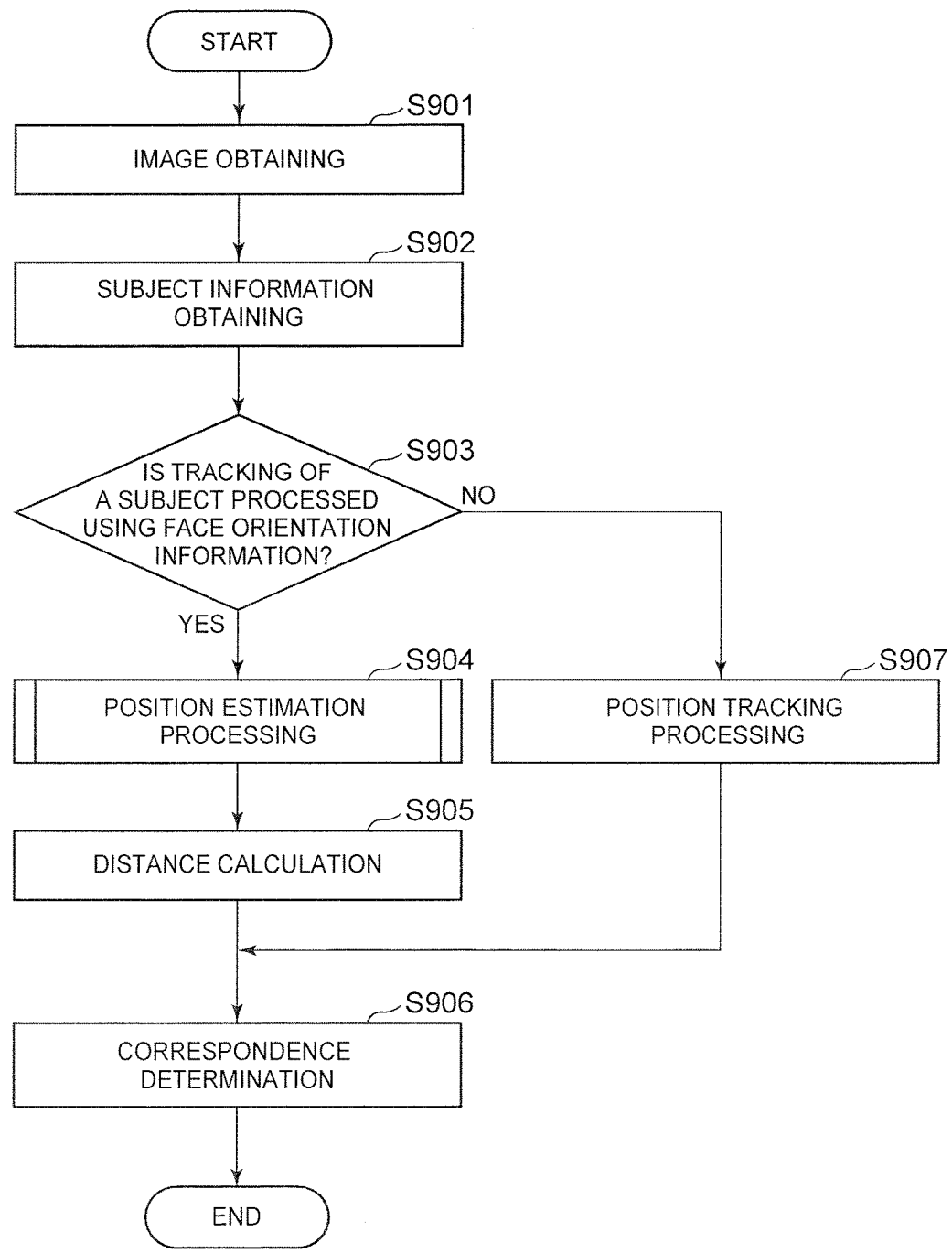
FIG. 9 is a flow chart illustrating the processing steps of the information processing apparatus according to some exemplary embodiments.
Figure 10:
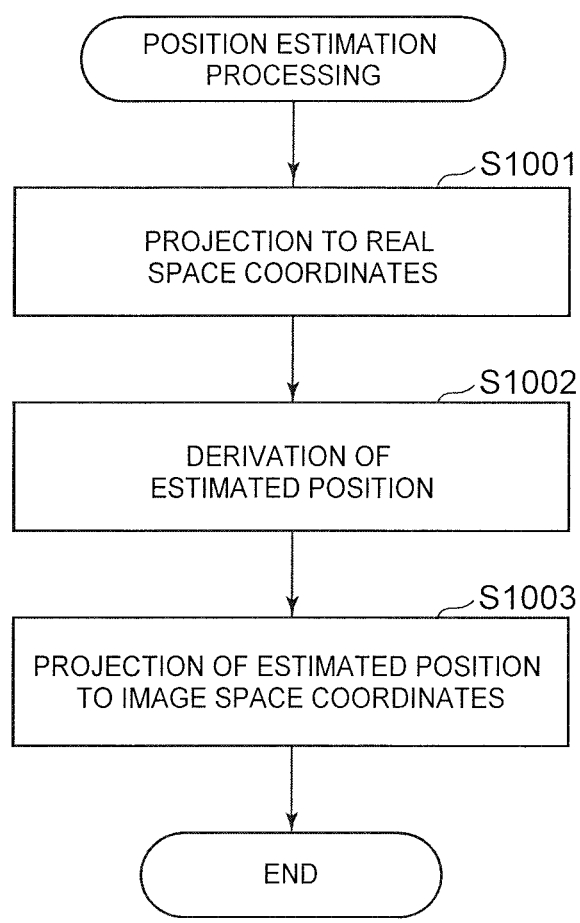
FIG. 10 is a flowchart illustrating the processing steps of an estimation unit according to some exemplary embodiments.

The processing steps of the information processing apparatus 300 according to the present embodiment will be described with reference to FIG. 9 and FIG. 10. FIG. 9 is a flow chart illustrating the processing steps of the information processing apparatus 300 according to the present embodiment. FIG. 10 is a flow chart illustrating the processing steps of the estimation unit 303 according to the present embodiment. The processes indicated by these flow charts may be executed by the CPU 701 using the RAM 703, thereby achieving the functional constituent units of the information processing apparatus 300.

In step S901, the image obtaining unit 301 may obtain images. In the present embodiment, the current and past images of a subject may be obtained.

In step S902, the object information obtaining unit 302 may obtain various information of the subject, for example, information such as the orientation, size, and position of the subject. In the present embodiment, the orientation, size, and position of the first subject and the orientation and size of the second subject may be obtained.

In step S903, the information processing apparatus 300 determines whether or not tracking of a subject is processed using information on the face orientation of the subjects based on the images obtained in step S901. For example, in a situation where a subject is hidden by another object or another subject and the subject to be tracked cannot be found in the images obtained in step S901, it is determined that tracking of a subject is processed using information on the face orientation of the subjects. When tracking of a subject is processed not using the face orientation information of the subject (NO in step S903), the information processing apparatus 300 may continue position tracking processing without using the face orientation information. When it is determined that tracking of a subject is processed using the face orientation information of the subject (YES in step S903), the information processing apparatus 300 may proceed to the next step S904.

In step S904, the estimation unit 303 may derive an estimated position in the current image. The position estimation processing performed by the estimation unit 303 will be further described with reference to FIG. 10. In step S1001, the estimation unit 303 may project the orientation, size, and position of the first subject and the orientation and size of the second subject from image space coordinates to real space coordinates. In step S1002, the estimation unit 303 may derive an estimated current position of the subject using the projected orientation, size, and position of the first subject and the projected orientation and size of the second subject. In step S1003, the estimation unit 303 may project the derived estimated position from real space coordinates to image space coordinates. The processing may proceed to step S905.

In step S905, the calculation unit 304 may calculate the distance between the estimated position and the position of the second subject in the current image.

In step 906, based on the calculated distance, the determination unit 305 may determine whether or not the first subject and the second subject are the same object, that is, determine whether or not correspondence exists between the first subject and the second subject. In some instances, the determination unit 305 may make determination by comparing the calculated distance with a predetermined threshold value. For example, when the calculated distance is within a predetermined threshold value, it may be determined that the first subject and the second subject are the same object, and the correspondence between both objects may be established. When a plurality of second subjects is present, it may be determined that a second subject with the shortest distance is the same as the first subject, and the correspondence between both objects may be established. Further, the probability that the first subject and a second subject are the same object may be calculated based on the calculated distance, and a second subject with the highest probability may be determined to be the same object, and the correspondence between both objects may be established.

According to the present embodiment, the estimation unit 303 may derive an estimated position based on the orientation, size, and position of the first subject in the past image and the orientation and size of the second subject in the current image, and thus an estimated position can be derived with high accuracy. Because the estimation unit 303 can derive an estimated position with high accuracy, even when a subject is hidden by another object or another subject and disappears from the image area, tracking can be continued. Further, the determination unit 305 may determine whether or not the same object is present based on the distance between the estimated position calculated by the calculation unit 304 and the position in the current image area, and thus the determination can be made easily and quickly. Therefore, even when a frame in an invisible state exists in a series of frames, tracking can be continued.

[Other Exemplary Embodiments]

It will be apparent to those skilled in the art that various modifications and variations can be made to the disclosed embodiments. Other embodiments will be apparent to those skilled in the art from consideration of the specification and practice of the disclosed embodiments. It is intended that the specification and examples be considered as exemplary only, with a true scope being indicated by the following claims.

The present disclosure (s) may be applied to a system including a plurality of devices and may also be applied to a single apparatus. Further, the present disclosure (s) may be also applicable to a system or an apparatus to which an information processing program that achieves the function of the embodiments is supplied directly or remotely. A program installed in a computer, a medium storing the program, and WWW (World Wide Web) server that allows the program to be downloaded in order to achieve the function of the present disclosure (s) with a computer may be also included in the category of the present disclosure (s). In particular, non-transitory computer readable medium, which stores at least a program that causes a computer to execute the processing steps included in the above-described embodiments, is included in the category of the present disclosure (s).

The invention claimed is:

1. An information processing apparatus comprising:
a memory storing instructions; and
at least one processor configured to process the instructions to:
obtain an orientation, size, and position of a first subject in a first image, and an orientation, size, and a real position of a second subject in a second image,
generate an estimated position of the first subject in the second image based on the orientation, size, and position of the first subject in the first image and the orientation and size of the second subject in the second image by using an amount of change between the size of the first subject in the first image and the size of the second subject in the second image,
calculate a distance in real space between the estimated position of the first subject in the second image and the real position of the second subject in the second image, and
determine whether or not the first subject is the second subject based on the distance.

2. The information processing apparatus according to claim 1, wherein the at least one processor is further configured to process the instructions to:
obtain the first image in response to the first subject being in motion, and obtain the second image in response to the second subject being in motion.

3. The information processing apparatus according to claim 1, wherein the at least one processor is further configured to process the instructions to:
track the first subject,
determine whether the first subject becomes obscured during the tracking; and
generate the estimated position of the first subject in the second image in response to determining that the first subject becomes obscured.

4. The information processing apparatus according to claim 1, wherein the at least one processor is further configured to process the instructions to:
calculate a probability that the first subject is the second subject based on the distance, and
determine whether the first subject is the second subject based on the probability.

5. The information processing apparatus according to claim 1, wherein the first subject has a face and the second subject has a face.

6. The information processing apparatus according to claim 5, wherein the at least one processor is further configured to process the instructions to:
obtain, as the size of the first subject, an inter-eye distance of the face of the first subject, and
obtain, as the size of the second subject, an inter-eye distance of the face of the second subject.

7. An information processing method comprising:
obtaining an orientation, size, and position of a first subject in a first image, and an orientation, size and a real positon of a second subject in a second image;
generating an estimated position of the first subject in the second image based on the orientation, size, and position of the first subject in the first image and the orientation and size of the second subject in the second image by using an amount of change between the size of the first subject in the first image and the size of the second subject in the second image;
calculating a distance in real space between the estimated position of the first subject in the second image and the real position of the second subject in the second image; and
determining whether or not the first subject is the second subject based on the distance.

8. The information processing method according to claim 7, further comprising:
obtaining the first image in response to the first subject being in motion, and obtaining the second image in response to the second subject being in motion.

9. The information processing method according to claim 7, further comprising:
tracking the first subject;
determining whether the first subject becomes obscured during the tracking; and
generating the estimated position of the first subject in the second image in response to determining that the first subject becomes obscured.

10. The information processing method according to claim 7, further comprising:
calculating a probability that the first subject is the second subject based on the distance; and
determining whether the first subject is the second subject based on the probability.

11. The information processing method according to claim 7, wherein the first subject has a face and the second subject has a face.

12. The information processing method according to claim 11, further comprising:
obtaining, as the size of the first subject, an inter-eye distance of the face of the first subject; and
obtaining, as the size of the second subject, an inter-eye distance of the face of the second subject.

13. A non-transitory computer-readable storage medium storing instructions that when executed by a computer enable the computer to implement a method comprising:
obtaining an orientation, size, and position of a first subject in a first image, and an orientation, size and a real positon of a second subject in a second image;
generating an estimated position of the first subject in the second image based on the orientation, size, and position of the first subject in the first image and the orientation and size of the second subject in the second image by using an amount of change between the size of the first subject in the first image and the size of the second subject in the second image;
calculating a distance in real space between the estimated position of the first subject in the second image and the real position of the second subject in the second image; and
determining whether or not the first subject is the second subject based on the distance.

14. The non-transitory computer-readable storage medium according to claim 13, wherein the method further comprises:
obtaining the first image in response to the first subject being in motion, and obtaining the second image in response to the second subject being in motion.

15. The non-transitory computer-readable storage medium according to claim 13, wherein the method further comprises:
tracking the first subject;
determining whether the first subject becomes obscured during the tracking; and
generating the estimated position of the first subject in the second image in response to determining that the first subject becomes obscured.

16. The non-transitory computer-readable storage medium according to claim 13, wherein the method further comprises:
calculating a probability that the first subject is the second subject based on the distance; and
determining whether the first subject is the second subject based on the probability.

17. The non-transitory computer-readable storage medium according to claim 13, wherein
the first subject has a face and the second subject has a face.

18. The non-transitory computer-readable storage medium according to claim 13, wherein the method further comprises:
obtaining, as the size of the first subject, an inter-eye distance of the face of the first subject; and
obtaining, as the size of the second subject, an inter-eye distance of the face of the second subject.

* * * * *

UNITED STATES PATENT AND TRADEMARK OFFICE
CERTIFICATE OF CORRECTION

PATENT NO. : 9,836,655 B2
APPLICATION NO. : 14/747499
DATED : December 5, 2017
INVENTOR(S) : Jia Hao Page 1 of 1

It is certified that error appears in the above-identified patent and that said Letters Patent is hereby corrected as shown below:

In the Specification

Column 5, Line 20: "and", has been replaced with --$\xi$--

Signed and Sealed this
Eighth Day of January, 2019

Andrei Iancu
*Director of the United States Patent and Trademark Office*